April 4, 1967 P. S. HESSINGER ET AL 3,312,771

MICROELECTRONIC PACKAGE

Filed Aug. 7, 1964

INVENTORS
PHILIP S. HESSINGER
ALLEN R SHEETS
by Greene and Durr
ATTORNEYS.

United States Patent Office 3,312,771
Patented Apr. 4, 1967

3,312,771
MICROELECTRONIC PACKAGE

Philip S. Hessinger, West Caldwell, and Allen R. Sheets, Oak Ridge, N.J., assignors to National Beryllia Corp., Haskell, N.J., a corporation of New Jersey Filed Aug. 7, 1964, Ser. No. 388,195
1 Claim. (Cl. 174—52)

This invention relates to the packaging of micro-elements which micro-elements act as units in such devices as microelectronic computers.

Micro-elements, such as semiconductor chips, etc., employed in the construction of electronic equipment must be insulated and protected from contamination, oxidation and excess heat, while at the same time electrical connections must be provided for the same.

Among the objects of the present invention is to provide an insulating package for microelectronic elements which protects the same from contamination, oxidation, and at the same time acts as a heat sink device to effectively dissipate heat generated by the operation of the elements. The "package" referred to is a substantially permanent holder for such devices rather than a temporary or retail sales package.

The objects of the invention are attained by providing a beryllium oxide base having one or more pockets or recessed slots, each adapted to receive one or more microelements and also having embedded conductor elements each with one exposed terminal adjacent the pocket and one terminal extending outwardly from the base. The base is provided with a metallized peripheral layer by means of which a cover can be soldered to provide a complete enclosure for the elements.

Each of the microelectronic elements ordinarily requires several connections to the outside, each connection being insulated from the others. The completed package is therefore a modular unit ready for electrically connecting with other similar or diverse units to provide the electronic device required.

The cover which is applied to form the enclosure may be of an alloy specially adapted to fairly well match the heat expansion coefficients of the beryllia such as the "Kovar" alloys of Fe, Ni and Co, or it may be of ceramic material such as beryllia, alumina, mixtures thereof, etc. Conventional soldering techniques are satisfactory for soldering the cover to the base and the free space inside the base and cover is preferably substantially free of air when the parts are soldered together.

Additional objects and advantages will be apparent from the following detailed description of specific modifications of the device of the invention when read in connection with the accompanying drawing, in which, FIG. 1 is an exploded perspective view of a base and cover of a device made according to the invention.

Figures 1, 2, 3, 4, 5:
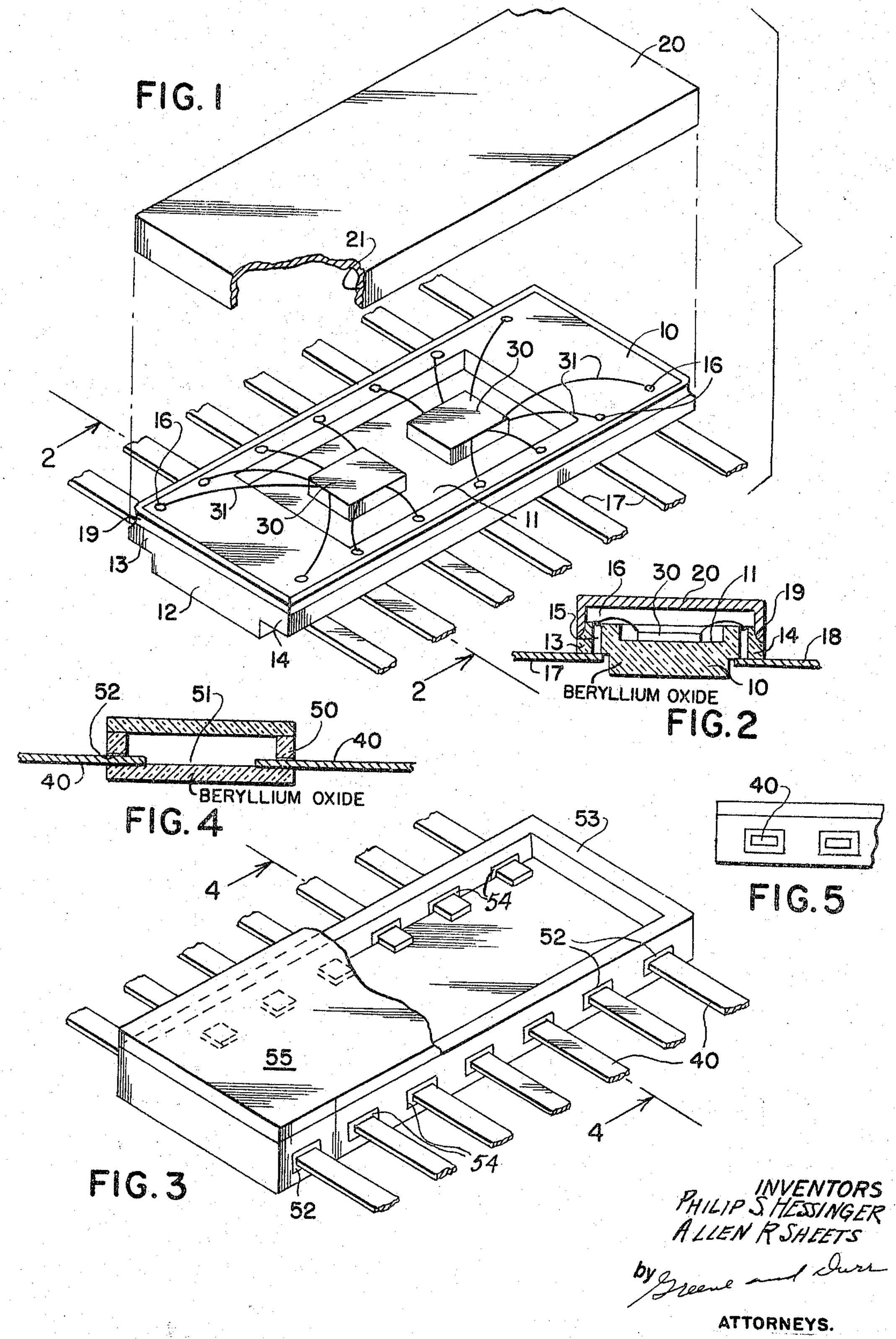
FIG. 2 is a cross-sectional view taken in line 2—2 of FIG. 1.
FIG. 3 is an exploded perspective view of a base and cover of a modified form of the device without the micro-elements, however.
FIG. 4 is a view taken on line 4—4 of FIG. 3, showing the assembled device in cross-section.
FIG. 5 is a fragmentary view of the device of FIGS. 3 and 4 from the side thereof.

In the form of the device shown in FIGS. 1 and 2, the base 10 comprises the recessed pocket 11 adapted to receive one or more microelectronic devices 30. The central portion 12 of the base is somewhat thicker than the side edges 13 and 14. Embedded within the side edges of the base are the conductor elements 15 having an exposed portion 16 at the upper surface. Terminals 17 extend outwardly from the lower end of conductors 15 of edge 13 and terminals 18 extend from the lower end of conductors 15 of the edge 14. The conducting terminals 17–15 or 18–15 may be made in one piece of conducting material or may be of two separate parts, 17 and 15 or 18 and 15, united to form a conducting element from terminal 16 to the outer end of said terminals 17 or 18. Wires 31 from elements 30 are electrically connected to the terminals 16 by any suitable means such as by soldering, spot welding, or compression bonding.

When the base 10 is to be vacuum sealed to a metal cover such as the "Kovar" cover 20, the upper edge is preferably beveled or shouldered as illustrated at 19 (FIG. 2) to provide an enlarged area of contact with the inner walls 21 of the cover 20. The edge 19 is coated with a layer of metal to provide a solder seal layer for the cover 20. The cover 20 is solder sealed to the base 10 while maintained in a vacuum to provide an oxygen free atmosphere within the pocket 11.

In the form of the device shown in FIGS. 3–5, the conductor elements 40 extend through the side walls of the beryllia base 50 into the pocket 51. Conductor elements 40 may be formed of a "Dumet" type of material having an alloy core of 42% Ni and 58% Fe and an outer sheath of 18–22% by volume of Cu. The base 50 is formed with a plurality of side orifices 52 therein and after the base has been sintered, the conductors 40 are solder sealed or brazed in the orifices 52 as by brazing 54. The top portion of the base is made with a fairly wide rim 53 which is metallized to provide a fairly wide area for soldering the ceramic or metal cover 53 thereto.

The following example illustrates how bases such as the base 10 or 50 is formed of beryllia.

*Example*

Beryllium oxide powder of −325 mesh size is mixed with water and a temporary organic binder, molded to shape at 8,000 to 15,000 p.s.i., and sintered at 1500° to 1900° C. The resultant body has a density of 2.85 g./cc. (as compared with the maximum theoretical density of 3.008 g./cc.) and is substantially impervious to gases. In making a base such as that shown in FIGS. 1–2, the base is formed with openings through the edge portions 13 and 14 where the conductors 15 are to be. After sintering, conductor elements 15 are formed in said opening by filling with a powdered metal slurry such as molybdenum which after sintering is impregnated with molten braze metal, such as copper-silver eutectic. This may be achieved during the braze cycle and the leads 17 attached simultaneously.

In making the device of FIGS. 3–5, the lead openings 52 are sealed with combined metallizing-braze metal which both bonds and seals the leads in a single operation.

The dimensions of a typical base 10 or 50, such as shown in FIGS. 1–5, is about 0.15" x 0.35" x 0.035".

We claim:

A module-like package comprising in combination, a base formed of sintered beryllium oxide having a density of about 2.85 g./cc., said base having a recessed pocket on the upper surface thereof adapted to receive at least one microelectronic element having a plurality of electrically connecting leads, said base having edge portions containing a plurality of orifices therein, at least one microelectronic element having a plurality of electrically connecting leads within said recess, a plurality of conductor elements each extending from the outside of said base, through one of said orifices in the edge portion of the base and being exposed at the upper surface of said base in the regions adjacent the recessed pocket thereof, the portion of each of said conductor elements which extends from outside of said base through an orifice in said edge portions of the base being formed of sintered powdered metal filled and bonded to the walls of the orifice with braze metal, means establishing electrical connections between the electrically connecting leads of said microelement and said conductor elements, cover means adapted to isolate the pocket and the regions containing the exposed upper portions of said conductor elements from the atmosphere, means forming a vacuum tight seal between said cover means and said base.

References Cited by the Examiner

UNITED STATES PATENTS

| | | | |
|---|---|---|---|
| 2,204,217 | 6/1940 | Herringer. | |
| 2,206,515 | 7/1940 | Scharfnagel | 174—152 X |
| 3,025,437 | 3/1962 | Van Namen et al. | |
| 3,062,981 | 11/1962 | Stoeckert | 174—50 X |
| 3,072,832 | 1/1963 | Kilby. | |
| 3,190,952 | 6/1965 | Bitko | 174—52 |
| 3,195,026 | 7/1965 | Wegner et al. | 174—52 X |
| 3,213,337 | 10/1965 | Long. | |
| 3,220,095 | 11/1965 | Smith. | |
| 3,222,450 | 12/1965 | Lee et al. | 174—50 X |

LEWIS H. MYERS, *Primary Examiner.*

D. L. CLAY, *Assistant Examiner.*